July 12, 1932. H. H. ROBERTSON 1,866,948
BEAN VINE CUTTER
Filed Jan. 17, 1931 3 Sheets-Sheet 1
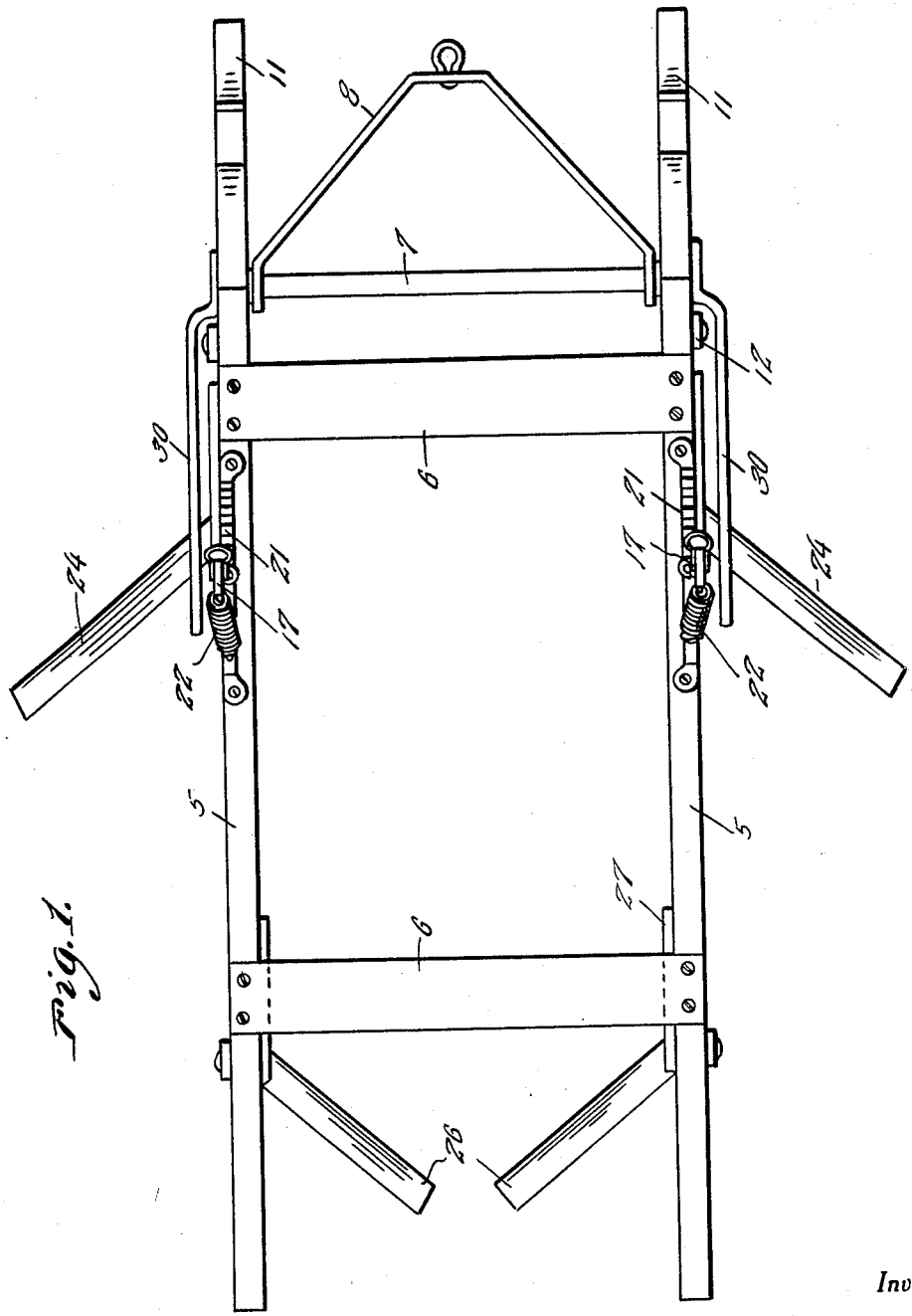
Inventor
H. H. Robertson
By Clarence A. O'Brien
Attorney

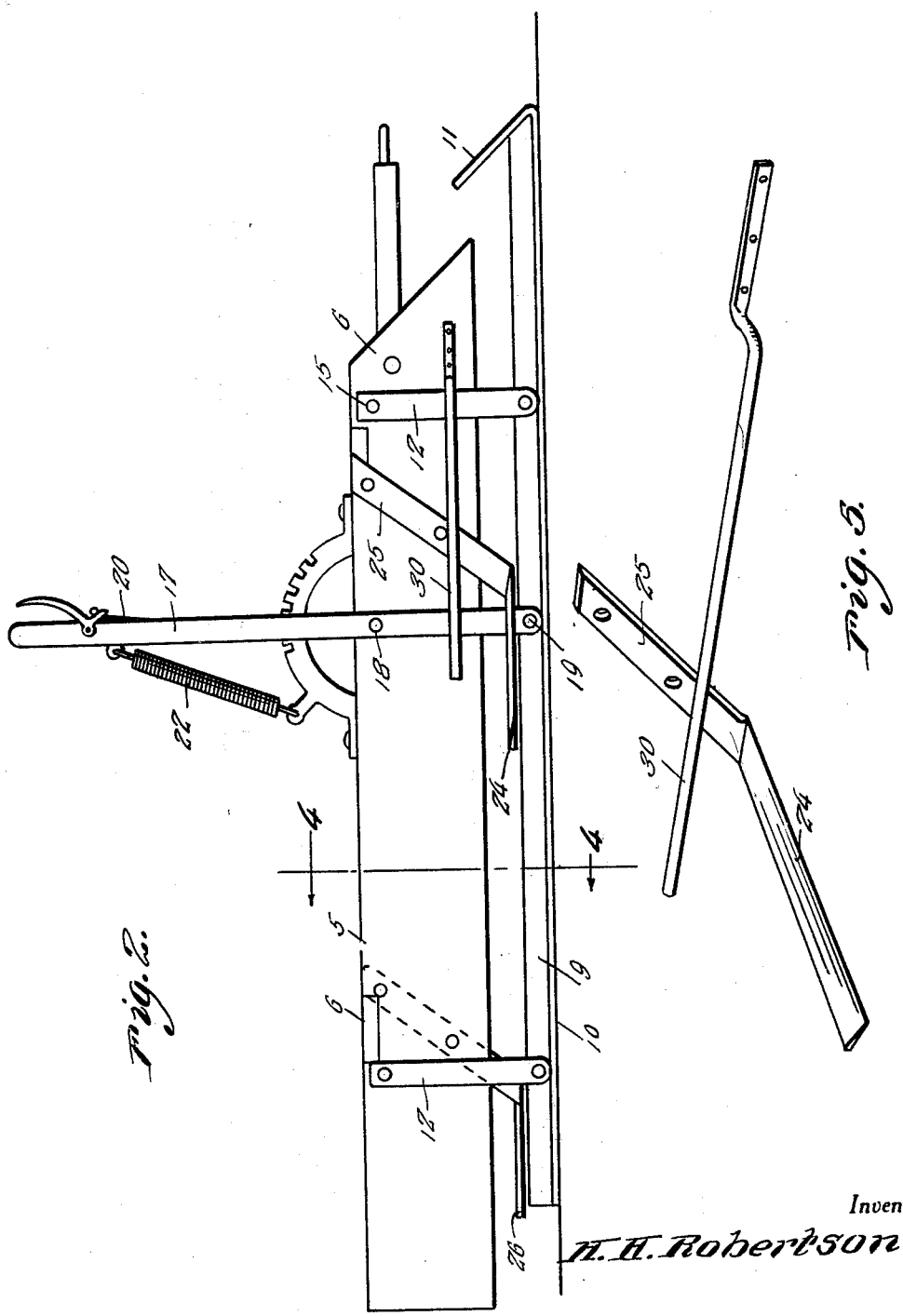

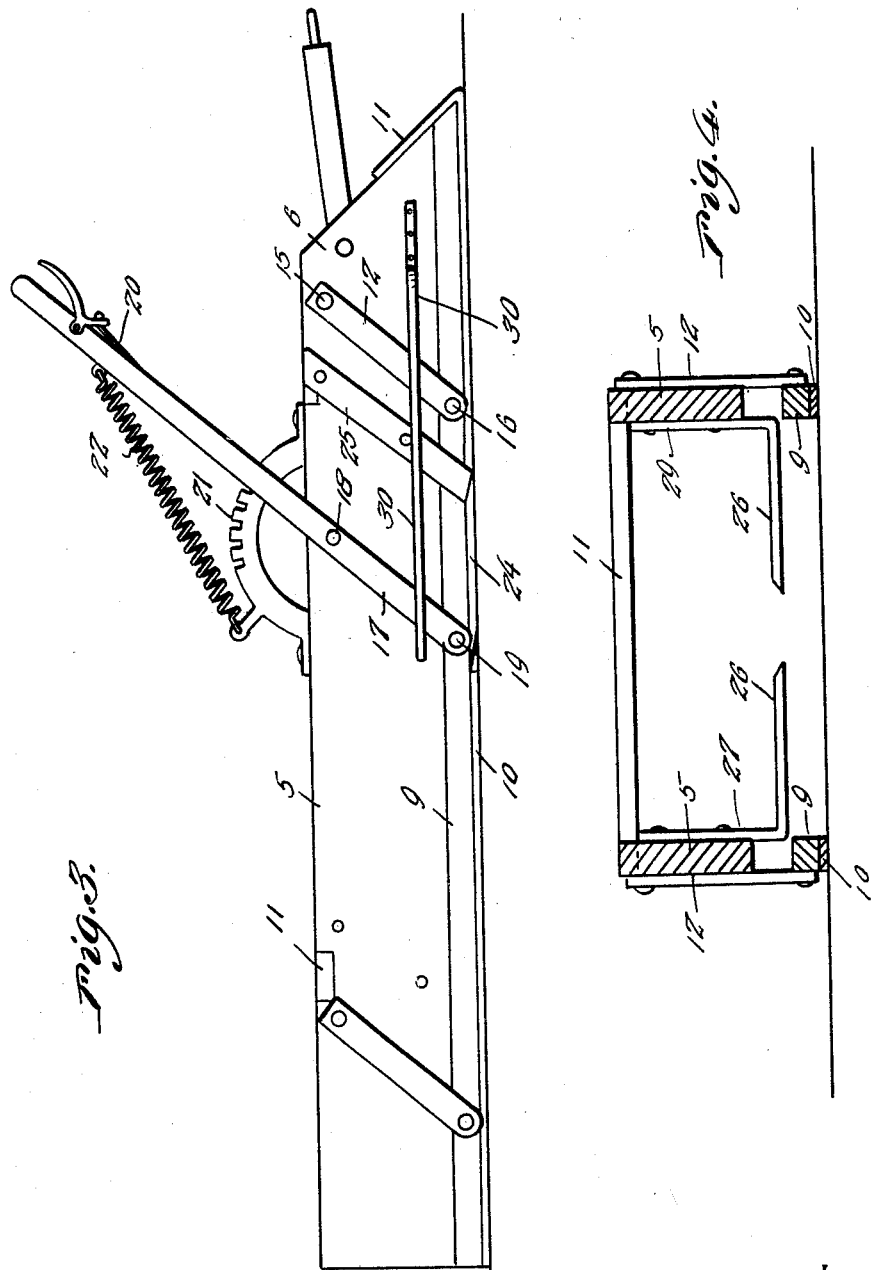

Patented July 12, 1932

1,866,948

UNITED STATES PATENT OFFICE

HARRY H. ROBERTSON, OF WORLAND, WYOMING

BEAN VINE CUTTER

Application filed January 17, 1931. Serial No. 509,508.

The present invention relates to harvesting machines and especially to bean vine cutters and the primary object of the invention is to make a bean vine cutter having a pair of outwardly directed cutting blades and a pair of inwardly directed cutting blades and means for adjusting the blades vertically with respect to the ground.

A further important object of the invention is to provide a vine cutter capable of wide manipulation as required for use upon rough ground.

A still further important object of the invention resides in the provision of a vine cutter which is exceedingly simple in construction, strong and durable, easy to manipulate, compact and convenient in its arrangement of parts, thoroughly efficient and reliable in use and operation, not likely to easily become out of order, and otherwise well adapted to the purpose for which it is designed.

With the above and numerous other objects in views as will appear as the description proceeds, the invention resides in certain novel features of construction, and in the combination and arrangement of parts as will be hereinafter more fully described and claimed.

Figure 1 is a top plan view of a bean vine cutter embodying the features of my invention.

Figure 2 is a side elevation thereof showing the blade in a raised position,

Figure 3 is a similar view showing the blade in a lowered position.

Figure 4 is a vertical transverse section taken substantially on the line 4—4 of Figure 2, and Figure 5 is a perspective view of one of the blades and guards.

Referring to the drawings in detail it will be seen that I provide an upper and a lower frame. The upper frame comprises a pair of elongated spaced parallel coextensive side members 5, the forward edges of which are beveled as indicated at 6. The side members 5 are connected by cross members 6. A cross bar 7 between the forward end portions of the side members 5 and yoke 8 is attached thereto.

The lower frame comprises elongated side members 9 under which are runners 10 having upwardly and rearwardly inclined front extensions 11. Links 12 are pivotally engaged as at 14 with the side members 5 and as at 16 with the side members 9 in a parallelogram arrangement. Levers 17 are pivotally connected intermediate their ends at 18 with the side members 5 and at their lower ends as at 19 with the side members 9. Suitable detent structures 20 are associated with the levers 17 to cooperate with notched segments 21 and springs 22 are anchored on the segments 21 and engaged with the upper ends of the levers to urge the upper ends of the levers rearwardly that is to the position shown in Figure 2 which is the raised position of the upper frame with respect to the lower frame.

Numerals 24 denote outwardly extending blades which diverge rearwardly with respect to each other and have shanks 25 rising from their inner ends and secured to the outer surfaces of the side members 5. Inner blades 26 converge rearwardly toward each other and are provided with shanks 27 at their outer ends rising therefrom and secured on the inner surfaces of the side members 5.

When the side members 5 rest on the side members 9 as indicated in Figure 3, the four blades 24 and 26 are on the same level with the runners 10. One side member 9, of course, may be adjusted independently of the other. Guards 30 are attached to the side members 5 on the outer surfaces of their forward ends and extend rearwardly by the forward links 12 and the levers 17.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a bean vine cutter of the class described, an upper frame and a lower frame, said upper frame comprising a pair of longitudinal side members, said lower frame including a pair of longitudinal side members under which are runners, cross members connecting the side members of the upper frame, links connecting the side members with the two frames together, a lever having one end pivotally connected to a side member of the lower frame and another part pivotally connected to a side member of the top frame whereby tilting movement of the lever will raise and lower the top frame with respect to the lower frame, and blades carried by the upper frame.

2. In a bean vine cutter of the class described, an upper frame and a lower frame, said upper frame comprising a pair of longitudinal side members, said lower frame including a pair of longitudinal side members under which are runners, cross members connecting the side members of the upper frame, means for raising and lowering the upper frame with respect to the lower frame, blades mounted on the side members of the upper frame and extending outwardly therefrom, and diverging rearwardly with respect to each other, a pair of inner blades extending inwardly and converging rearwardly with respect to each other and attached to the side members of the upper frame, said means for raising and lowering the upper frame with respect to the lower frame comprising links pivotally connected to the side members of the two mentioned frames, levers pivotally connected to the side members of the two mentioned frames and terminating above the upper frame.

3. In a bean vine cutter of the class described, an upper frame and a lower frame, said upper frame comprising a pair of longitudinal side members, said lower frame including a pair of longitudinal side members under which are runners, cross members connecting the side members of the upper frame, means for raising and lowering the upper frame with respect to the lower frame, blades mounted on the side members of the upper frame and extending outwardly therefrom, and diverging rearwardly with respect to each other, a pair of inner blades extending inwardly and converging rearwardly with respect to each other and attached to the side members of the upper frame, said means for raising and lowering the upper frame with respect to the lower frame comprising links pivotally connected to the side members of the two mentioned frames, levers pivotally connected to the side members of the two mentioned frames and terminating above the upper frame, notched segments on the upper frame and said levers having detent structures cooperable therewith.

4. In a bean vine cutter of the class described, an upper frame and a lower frame, said upper frame comprising a pair of longitudinal side members, said lower frame including a pair of longitudinal side members under which are runners, cross members connecting the side members of the upper frame, means for raising and lowering the upper frame with respect to the lower frame, blades mounted on the side members of the upper frame and extending outwardly therefrom, and diverging rearwardly with respect to each other, a pair of inner blades extending inwardly and converging rearwardly with respect to each other and attached to the side members of the upper frame, said means for raising and lowering the upper frame with respect to the lower frame comprising links pivotally connected to the side members of the two mentioned frames, levers pivotally connected to the side members of the two-mentioned frames and terminating above the upper frame, notched segments on the upper frame and said levers having detent structures cooperable therewith, spring means urging the upper ends of the levers rearwardly.

In testimony whereof I affix my signature.

HARRY H. ROBERTSON.